(12) United States Patent
Araujo et al.

(10) Patent No.: US 10,887,346 B2
(45) Date of Patent: Jan. 5, 2021

(54) APPLICATION-LEVEL SANDBOXING

(71) Applicant: International Business Machines Corporation, Armonk, NY (US)

(72) Inventors: Frederico Araujo, White Plains, NY (US); Douglas Lee Schales, Ardsley, NY (US); Marc Philippe Stoecklin, White Plains, NY (US); Teryl Paul Taylor, Danbury, CT (US)

(73) Assignee: International Business Machines Corporation, Armonk, NY (US)

( * ) Notice: Subject to any disclaimer, the term of this patent is extended or adjusted under 35 U.S.C. 154(b) by 168 days.

(21) Appl. No.: 15/691,792

(22) Filed: Aug. 31, 2017

(65) Prior Publication Data
US 2019/0068641 A1 Feb. 28, 2019

(51) Int. Cl.
| | |
|---|---|
| *H04L 29/06* | (2006.01) |
| *G06F 21/53* | (2013.01) |
| *G06F 21/54* | (2013.01) |
| *G06F 21/56* | (2013.01) |
| *G06F 9/455* | (2018.01) |

(52) U.S. Cl.
CPC .......... *H04L 63/1491* (2013.01); *G06F 21/53* (2013.01); *G06F 21/54* (2013.01); *G06F 21/566* (2013.01); *H04L 63/1416* (2013.01); *G06F 9/45558* (2013.01); *G06F 2221/2149* (2013.01)

(58) Field of Classification Search
CPC . H04L 63/1491; H04L 63/1416; G06F 21/54; G06F 21/566; G06F 21/53; G06F 2221/2149; G06F 9/45558
See application file for complete search history.

(56) References Cited

U.S. PATENT DOCUMENTS

| | | | |
|---|---|---|---|
| 7,451,196 B1 * | 11/2008 | de Vries | G06F 8/61 709/220 |
| 7,647,633 B2 | 1/2010 | Edery et al. | |

(Continued)

OTHER PUBLICATIONS

Yan Wen, "A Survey of Virtualization Technologies Focusing on Untrusted Code Execution", 2012 Sixth International Conference on Innovative Mobile and Internet Services in Ubiquitous Computing, 6 pages (Year: 2012).*

(Continued)

*Primary Examiner* — Chau Le
*Assistant Examiner* — Han Yang
(74) *Attorney, Agent, or Firm* — Jeffrey S. LaBaw; David H. Judson

(57) ABSTRACT

Rapid deployments of application-level deceptions (i.e., booby traps) implant cyber deceptions into running legacy applications both on production and decoy systems. Once a booby trap is tripped, the affected code is moved into a decoy sandbox for further monitoring and forensics. To this end, this disclosure provides for unprivileged, lightweight application sandboxing to facilitate monitoring and analysis of attacks as they occur, all without the overhead of current state-of-the-art approaches. Preferably, the approach transparently moves the suspicious process to an embedded decoy sandbox, with no disruption of the application workflow (i.e., no process restart or reload). Further, the action of switching execution from the original operating environment to the sandbox preferably is triggered from within the running process.

25 Claims, 6 Drawing Sheets

(56) References Cited

U.S. PATENT DOCUMENTS

| | | | |
|---|---|---|---|
| 9,098,698 | B2 | 8/2015 | Ghosh et al. |
| 9,323,921 | B2 | 4/2016 | Hunt et al. |
| 9,535,731 | B2* | 1/2017 | Ashley ................ G06F 9/45533 |
| 9,626,507 | B2 | 4/2017 | Krasin et al. |
| 2012/0216285 | A1* | 8/2012 | Walsh ..................... G06F 21/53 726/26 |
| 2013/0160115 | A1* | 6/2013 | Venkataramanappa ..................... G06F 11/3409 726/22 |
| 2015/0007315 | A1* | 1/2015 | Rivera ..................... G06F 21/51 726/23 |
| 2017/0099228 | A1* | 4/2017 | Hunsperger ........ H04L 47/2441 |
| 2017/0134423 | A1* | 5/2017 | Sysman ................ G06F 21/554 |
| 2017/0193223 | A1* | 7/2017 | Striem-Amit ........... G06F 21/44 |
| 2017/0195364 | A1* | 7/2017 | Levin .................. H04L 63/1491 |

OTHER PUBLICATIONS

Adam J. Aviv, "Lec. 14: exec()/fork()/wait() cycles for Process Management", May 2017, 7 pages (Year: 2017).*

Mahmud Ridwan, "Separation Anxiety: A Tutorial for Isolating Your System with Linux Namespaces", 2015, 12 pages (Year: 2015).*

David S. Peterson, "A Flexible Containment Mechanism for Executing Untrusted Code", 2002, 11th Annual USENIX Security Symposium, 27 pages (Year: 2002).*

Stephen Crane, "Booby Trapping Software", 2013, Proceedings of the 2013 New Security Paradigms Workshop, 11 pages (Year: 2013).*

Backes, et al, "Boxify: Full-fledged App Sandboxing for Stock Android," Proceedings of the 24th USENIX Security Symposium, Aug. 12, 2015.

Singh, et al,"An Application Sandbox Model based on Partial Virtualization of Hard-Disk and a Possible Windows Implementation," International Journal of Computer Applications (0975-8887) vol. 57—No. 7, Nov. 2012.

* cited by examiner

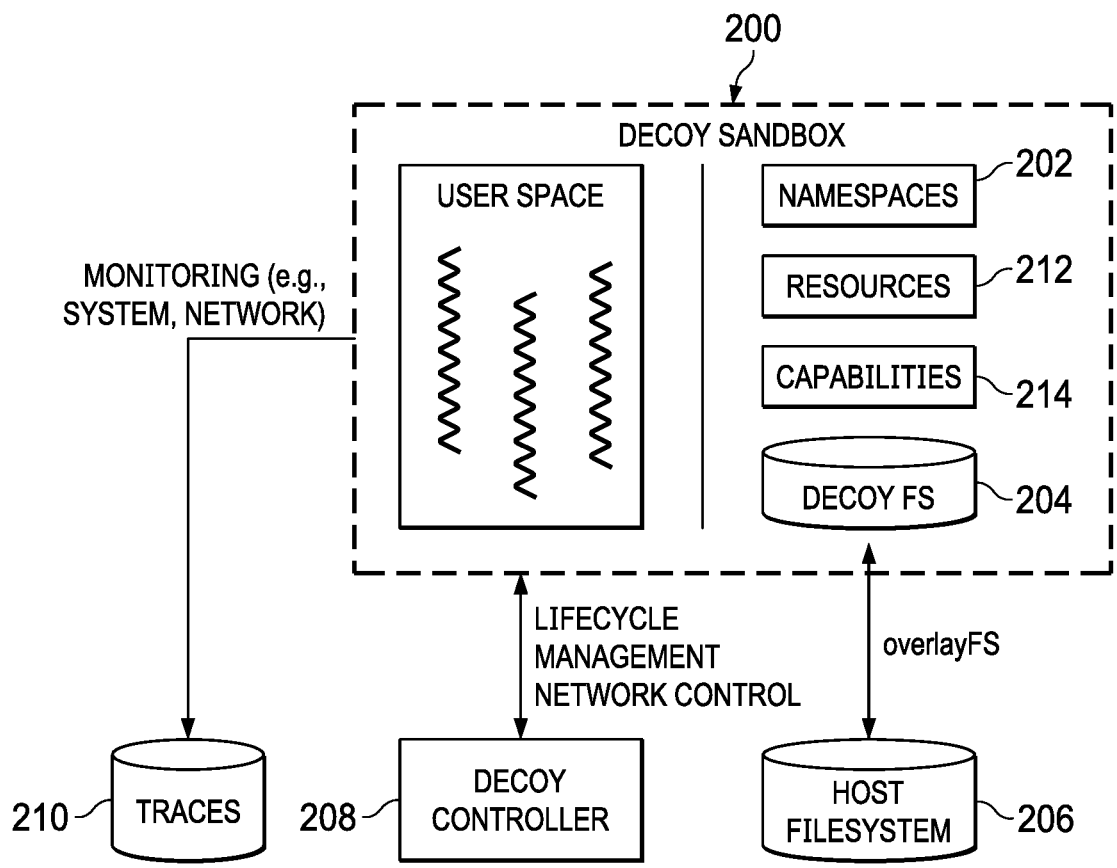

FIG. 2

| NAMESPACE | CONSTANT | ISOLATES |
|---|---|---|
| CGROUP | CGROUP | CGROUP ROOT DIRECTORY, FOR KERNEL RESOURCES CONTROL (e.g., CPU, MEMORY) |
| IPC | IPC | IPC RESOURCES (e.g., SYSTEM V IPC, POSIX MESSAGE QUEUES) |
| NETWORK | NET | NETWORK RESOURCES (e.g., DEVICES, STACKS, ROUTING TABLES, FIREWALLS) |
| MOUNT | NS | MOUNT POINTS SEEN BY THE PROCESS |
| PID | PID | PROCESS IDs |
| USER | USER | USER AND GROUP IDs |
| UTS | UTS | HOSTNAME AND NIS DOMAIN NAME |

FIG. 3

| LISTING 4: CREATING THE DECOY FILE SYSTEM |
|---|
| 1. mountDir = "/tmp/tmp.XXXX"
2. makeTempDir(mountDir)
3. mount("/decoyFs/",mountDir)
4. innerMountDir = "/tmp/tmp.XXXX/oldroot.XXXXX"
5. makeTempDir(innerMountDir)
6. pivot_root(mountDir, innerMountDir)
7. chdir("/")
8. mount("/proc")
9. unmount(innerMountDir)
10. removeDir(innerMountDir) |

FIG. 5

| | LISTING 2: SANDBOX CREATOR (SC) - UNPRIVILEGED | | LISTING 3: ACCESS GRANTER (AG) - PRIVILEGED |
|---|---|---|---|
| 1 | createCGroup("decoy")// done as root | 1 | |
| 2 | unshare(UTS \| USER \| NS \| PID \| IPC \| NET \| CGROUP) | 2 | |
| 3 | if fork() == 0 then | 3 | |
| 4 | dropCapabilities() | 4 | |
| 5 | notifyAndWait(AG, pid) → | 5 | wait(SC) |
| 6 | | 6 | writeUsermappings(pid) |
| 7 | mountDecoyFileSystem() | 7 | ← notifyAndWait(SC) |
| 8 | setHostName("decoy") | 8 | |
| 9 | notifyAndWait(AG) → | 9 | setupVirtualInterface(pid) |
| 10 | | 10 | linkVirtualInterfaceToHostInterface(pid) |
| 11 | | 11 | generateFirewallRules(pid) |
| 12 | bringUpNetworkDevice() | 12 | ← notifyAndWait(SC) |
| 13 | addVirtualRoute() | 13 | |
| 14 | notify(AG) → | 14 | persistNamespaces("/tmp/ns") |
| 15 | launch("/sbin/init") | 15 | |

FIG. 6

APPLICATION-LEVEL SANDBOXING

BACKGROUND

Technical Field

This disclosure relates generally to cyber security.

Background of the Related Art

Today, cyber attackers are breaching corporate networks using a myriad of techniques such as social engineering or water holing. More disturbing is that these attacks can go unnoticed for hundreds of days. These attacks not only enable the exfiltration of important confidential company data, but they also erode client trust. As a consequence, companies can no longer solely rely on perimeter-based defenses—such as intrusion detection systems (IDS) and firewalls—to protect their IT environments. More generally, traditional network traffic monitoring and misuse detection is unable to keep up with evolving attackers, sustains high error rates, and is akin to searching for a needle in an extremely large haystack. As a result, security researchers and companies alike must look inward to gain better visibility at every stage of the cyberattack lifecycle.

Adversaries typically perform initial reconnaissance missions before commencing actual attacks. Unfortunately, today's computer systems (e.g., networks, servers, services, APIs) are too honest and forthcoming in sharing tremendous amounts of information with attackers. Hence, with minimal effort, attackers can glean extremely valuable information on network topologies, currently running applications and their version and patch level, as well as potential vulnerabilities, all without the defender's knowledge. This information asymmetry favors attackers, allowing them to find a single weakness, while defenders are faced with the difficult task of keeping up.

As cyberattacks become more sophisticated there is an increasing need for better ways to detect and stop attackers. Cyber deception has garnered attention by both attackers and defenders as a weapon in the cyber battlefield. The notion of cyber counter-deception refers to the use of planned deceptions to defend information systems against attacker deceptions. Although such second-order deceptions remain largely underutilized in cyber-defensive scenarios, however, they are frequently used by attackers to search for evidence of honeypots, avoid malware analysis, and conceal their presence and identity on exploited systems. In the virtualization domain, malware attacks often employ stealthy techniques to detect virtual machine environments within which they behave innocuously and opaquely while being analyzed by antivirus tools.

Honeypots are closely monitored information systems resources that are intend to be probed, attacked, or compromised, conceived purely to attract, detect, and gather attack information. Traditional honeypots are usually classified per the interaction level provided to potential attackers. Low-interaction honeypots present a façade of emulated services without full server functionality, with the intent of detecting unauthorized activity via easily deployed pseudo-services. High-interaction honeypots provide a relatively complete system with which attackers can interact, and are designed to capture detailed information on attacks. Despite their popularity, both low- and high-interaction honeypots are often detectable by informed adversaries (e.g., due to the limited services they purvey, or because they exhibit traffic patterns and data substantially different than genuine services).

General principles for effective tactical deception in warfare prescribe that deceptions should (1) reinforce enemy expectations, (2) have realistic timing and duration, (3) be integrated with operations, (4) be coordinated with concealment of true intentions, (5) be tailored to contextual requirements, and (6) be imaginative and creative. These rules highlight limitations of current deception-based defenses. For example, conventional honeypots usually violate the third rule of integration as they are often deployed as ad hoc, stand-alone lures isolated from production servers. This makes them easily detectable by most advanced adversaries. They also assume that an adversary must scan the network to identify assets to attack.

By way of additional background, in computer security, a sandbox is a security mechanism for separating running programs, typically to address system failures or software vulnerabilities, and to prevent them from spreading. Conventional application sandboxing is designed to protect the host environment against unintended or malicious code execution. A sandbox is often used to execute untested or untrusted programs or code, possibly from unverified or untrusted third parties, suppliers, users or websites, without risking harm to the host machine or operating system. A sandboxing environment typically provides a tightly controlled set of processor and memory resources in which guest programs are permitted to run, and the ability to inspect the host system or read from input devices typically is disallowed or restricted.

There remains an increasing need for counter-deception mechanisms that are capable of tricking and manipulating advanced attacker deceptions, and that can enable efficient monitoring and forensic analysis.

BRIEF SUMMARY

Rapid deployments of application-level deceptions (i.e., booby traps) implant cyber deceptions into running legacy applications both on production and decoy systems. Once a booby trap is tripped, the affected code is moved into a decoy sandbox for further monitoring and forensics. A preferred approach is to fork the attacker into an unprivileged sandbox for further analysis. By doing so, the security analyst gains further insight into the attack (e.g., such as what malware is downloaded) that can be used to search for similar attacks on the network, or to provide threat intelligence for the future.

To this end, this disclosure provides for unprivileged, lightweight application sandboxing to facilitate monitoring and analysis of attacks as they occur, all without the overhead of current state-of-the-art approaches. Preferably, the approach transparently moves the suspicious process to an embedded decoy sandbox, with no disruption of the application workflow (i.e., no process restart or reload). Further, the action of switching execution from the original operating environment to the sandbox preferably is triggered from within the running process.

According to an embodiment, a method for application-level sandboxing is carried out in association with a host operating system that includes a namespace facility for creating and managing a set of namespaces. In this approach, two (2) processes are instantiated. A first process is executed as an unprivileged user, and the second process is executed as a privileged user. The first process uses the namespace facility to create an unprivileged decoy sandbox, and the second process is used to grant the decoy sandbox access to one or more computing resources of the host. The decoy sandbox preferably is creating on-demand, and it is lightweight because it is created and managed using a native operating system namespace facility. In response to tripping by an attacker of an application deception (i.e., a booby trap) in a target process, a copy of the target process is received in the unprivileged decoy sandbox. Thereafter, actions of the attacker within the unprivileged decoy sandbox are monitored.

Thus, according to the sandboxing approach herein, any production or decoy application can transfer, on-demand, a process suspected of being attacked into a lightweight sandbox. In this way, attackers are separated from benign users and can be monitored with any potential malicious payloads extracted for further analysis. These sandboxes provide added protection and constrain the attacker's capabilities, all without performance overhead.

The foregoing has outlined some of the more pertinent features of the subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which:

FIG. 2 depicts an architecture of a decoy sandbox according to this disclosure;

FIG. 3 is a table describing the various namespaces available in the Linux operating system kernel;

FIG. 5 provides a high-level overview of how a decoy filesystem is created and mounted during the process of building the decoy sandbox;

FIG. 6 depicts the process flow in FIG. 5 in additional detail;

DETAILED DESCRIPTION OF AN ILLUSTRATIVE EMBODIMENT

On-Demand Injection of Software Booby Traps in Live Applications

Figure 1:
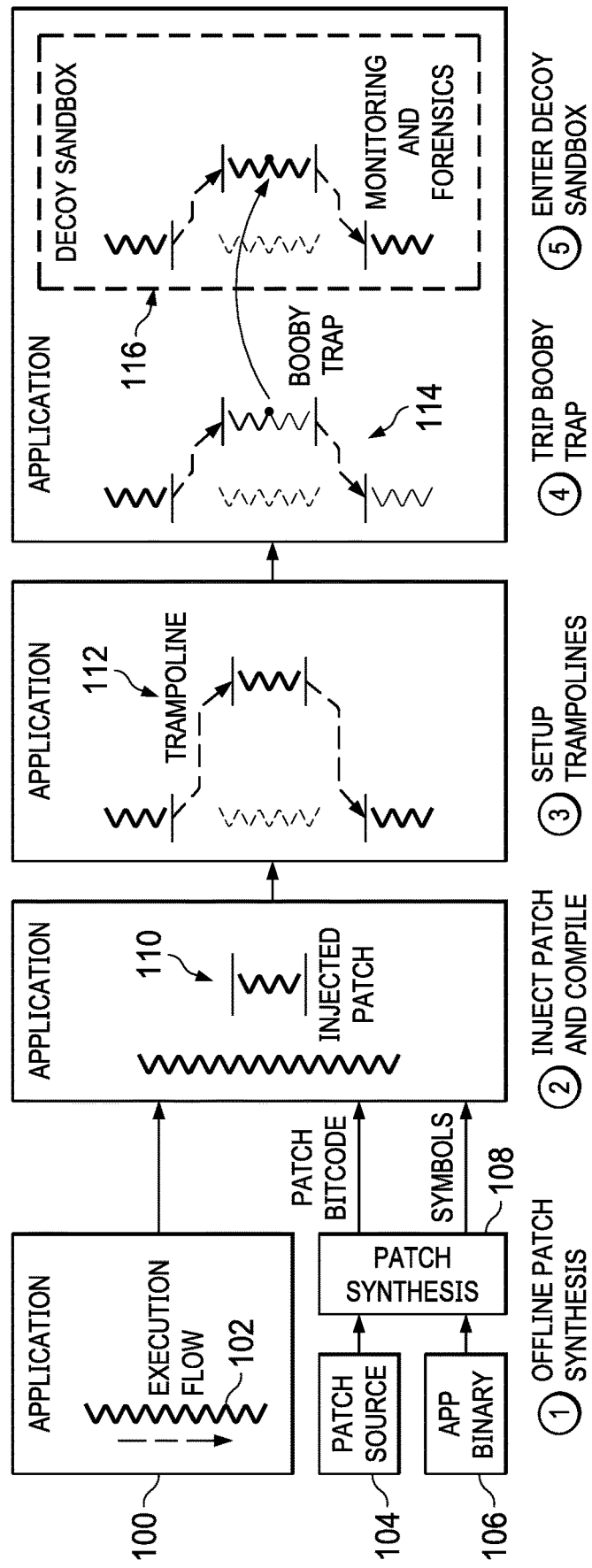
FIG. 1 provides an overview of an on-demand patching workflow according to this disclosure comprising patch synthesis, patch injection with in-memory patch compilation, and function updating via jump instructions injected at the entry point of a target function.

A preferred front-end to the application sandboxing technique of this disclosure is described by way of background. In particular, an application-level deception framework that may be utilized involves injecting deceptions directly into production applications. FIG. 1 depicts the basic framework and deception deployment model, which provides for rapid, on-demand application booby trapping. In particular, the drawing depicts a process of injecting a deception into a running target application 100 having an execution flow 102. Preferably, the process involves an offline step (step (1)), and four online steps, with steps (1) through (3) being used to inject the deception into the running application, followed by a response triggered by that deception as depicted at steps (4) and (5). In particular, at step (1), a booby trapped function (or "patch") is written (synthesized) to replace a function in the running application. To this end, a patch source and associated metadata 104, and a binary copy of the application 106 (and its symbols map), are provided to a patch synthesis function 108. The patch is compiled into bitcode, and symbols are extracted from app binary copy 106. As depicted in step (2), once the patch is synthesized by the patch synthesis function 108, it is deployed to the target application 100 and injected into the application's memory space. The patch is then compiled into native code on a separate execution thread 110 inside the process, and it is linked against the global symbols of the application using the symbol mappings from the patch synthesis phase. Next, and at step (3), the process is briefly paused to insert a trampoline 112 from the function that will be replaced with the patch to the patch. The deception is now deployed.

Then, and as depicted at step (4), when an attacker triggers a booby trap 114, the application elicits a user-defined response. The response may be a passive action, such as terminating the connection, collecting the attack payload, and/or notifying a security analyst. Moreover, the response also may be active, such as transparently moving the current execution thread of the application into a decoy sandbox 8 for further execution and in-depth analysis, providing disinformation, or temporarily activating rules to block an IP address. This active response is depicted at step (5).

Thus, the approach depicted in FIG. 1 injects the booby trap into the running application but causes no change to the benign execution flows, while threads tripping over the booby trap 114 preferably are moved into a decoy sandbox 8 for sandboxed and monitored continuation of the process execution.

Decoy Sandboxing for Monitoring and Forensics

As noted above, once a booby trap is tripped, according to this disclosure it is desirable to provide an active response and, in particular, to move the affected code into a decoy sandbox for further monitoring and forensics. A preferred approach is to fork the attacker into an unprivileged sandbox for further analysis. By doing so, the security analyst gains further insight into the attack (e.g., such as what malware is downloaded) that can be used to search for similar attacks on the network, or to provide threat intelligence for the future. The following describes a preferred sandboxing mechanism that provides these advantages.

FIG. 2 shows the overall architecture of a decoy sandbox 900 according to this aspect of the disclosure.

By way of brief background, in computer security, a "sandbox" is a security mechanism for separating running programs. Sandboxing often is used to execute untested or untrusted programs so as to avoid risking harm to a host machine or operating system. A sandbox typically provides a tightly-controlled set of resources for guest programs to run in, and network access typically is disallowed or heavily restricted.

As additional background for this aspect of the disclosure, it is known that modern operating systems (including, without limitation, Linux and Windows Server 2016) implement a feature known as "namespaces." A namespace isolates and virtualizes system resources for a collection of processes. In particular, namespaces are a kernel-level feature that wraps a global system resource into an abstraction, such that the process inside the namespace appears to have its own isolated instance of the global system resource. Processes inside a namespace are visible to others inside the same namespace, but they are opaque to processes outside the namespace. The Linux OS kernel provides seven (7) namespaces, each providing isolation for a different operating resource. Some examples of resources that can be virtualized include process IDs, hostnames, user IDs, and the like. FIG. 3 is a table identify each of these Linux OS namespaces by name and by what it isolates. The first namespace, cgroup, refers to the Linux kernel functionality called cgroups that allows limitation and prioritization of resources (CPU, memory, block I/O, network, etc.). A namespace also typically refers to namespace types (identified by the column titled "Constant," as well as to specific instances of these types. A Linux operating system is initialized with a single instance of each namespace type. After initialization, additional namespaces can be created or joined.

Further, these OS kernel namespaces are capable of being composed, meaning they can be mixed and matched depending on the desired isolation. For example, if it desired that two processes use completely different network devices but still share the same filesystem, the two processes can be placed in different network namespaces but share a same mount namespace.

It is also known to provide so-called "container" technology that combines the operating system kernel's support of cgroups and namespaces to provide isolated execution environments for applications. Thus, for example, where a host machine executes an operating system (OS), such as the Linux kernel, the operating system provides an OS-level virtualization method for running multiple isolated computing workloads (containers). Typically, a container in this environment hosts one or more applications. By providing a way to create and enter containers, the operating system gives applications the illusion of running on a separate machine while at the same time sharing many of the underlying resources.

Referring now back to FIG. 2, and as depicted, the architecture is based on operating system namespaces 202 to control memory, network, filesystem, user privileges, and process isolation from the global system. Preferably, the decoy sandbox 200 is built on top of a customizable decoy filesystem 204 that contains all the system files commensurate with a real OS filesystem 206, but that is isolated from the host file system. A decoy controller 208 creates the decoy sandbox 200 and monitors its activities transparently from the attacker. Information, such as packet, and system call traces 210, is collected during the life of the sandbox and used as threat intelligence or incident response.

As will be seen, this aspect of the disclosure provides for an unprivileged, lightweight application sandboxing approach, preferably based on Linux namespaces, that enables monitoring and analysis of attacks as they occur, all without the overhead of current state-of-the-art approaches. The above reference to implementation in Linux is not intended to be limiting, as other modern operating systems used similar constructs. Unlike conventional application sandboxing approaches that are designed to protect the host environment against unintended or malicious code execution, the approach herein benefits from recent advances in namespaces, which isolate system resources of a group of processes (e.g., users, process IDs, network access). Thus, in addition to the on-demand application booby trapping described above, this sandboxing mechanism builds unprivileged and capability-constrained containers atop Linux namespaces 202, process control groups 212, and Linux capabilities 214, thus allowing the framework to keep the trusted computing base small and further protect the application environment from attacker abuse. The approach is highly advantageous because it allows the host to transparently isolate the process (in which the booby trap has been tripped), limit its privileges, and monitor its actions. Moreover, because namespaces are built into the operating system fabric, decoy sandboxes are quickly deployed to any network host that supports them.

The following provides additional details regarding how to create and use an unprivileged sandbox according to an embodiment of this disclosure. Generalizing, to create an unprivileged decoy sandbox, two processes are used. The first process, called the Sandbox Creator (SC), is run as an unprivileged user and creates a decoy sandbox using the seven Linux OS namespaces (or some configurable subset thereof). The second process, called the Access Granter (AG), is run in privileged mode and grants the sandbox access to certain resources.

Figure 4:
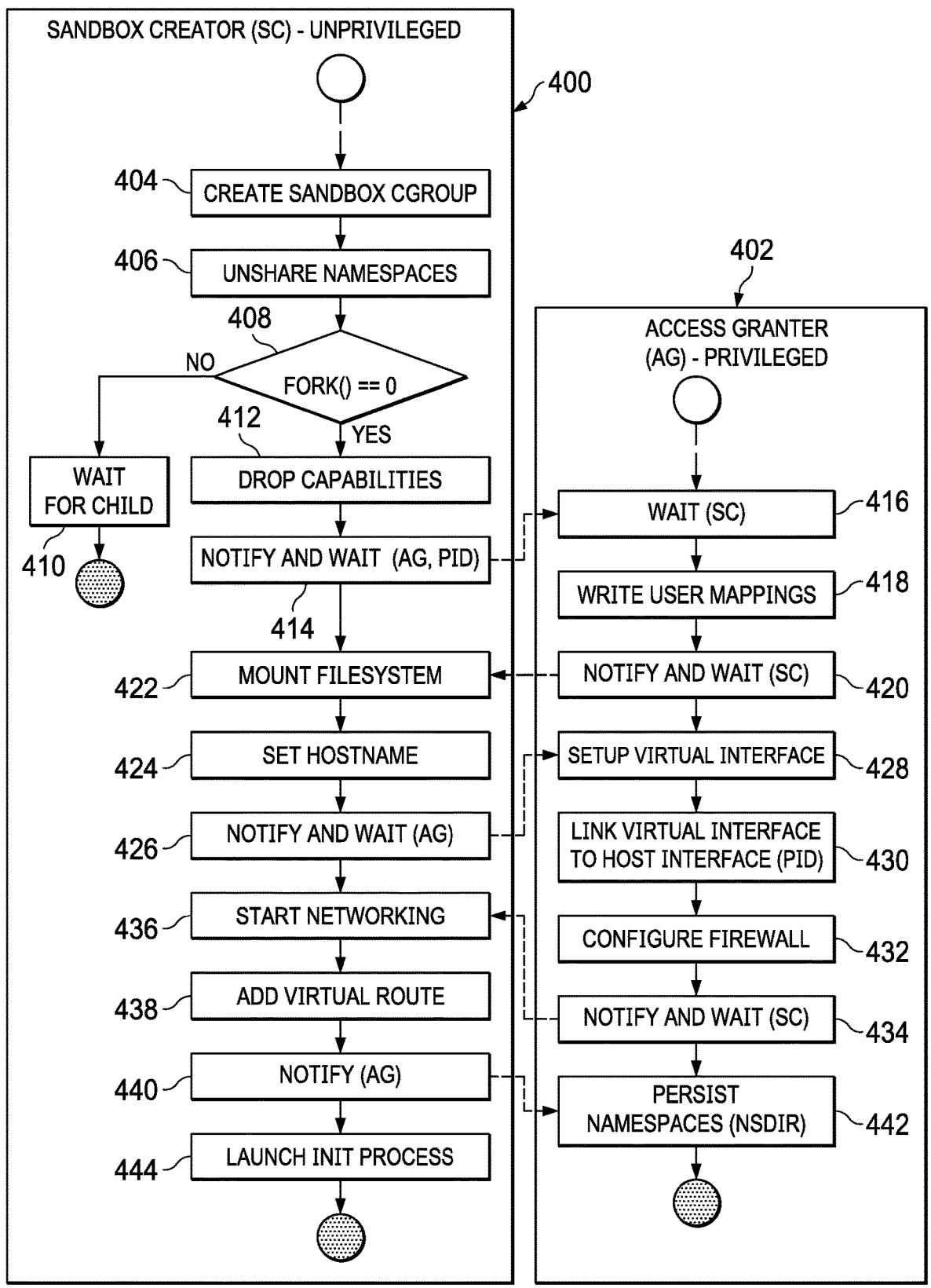
FIG. 4 depicts a process flow between an unprivileged sandbox creator process and a privileged access granter process to build a decoy sandbox according to an embodiment of this disclosure.

FIG. 4 is a process flow that depicts the cooperation between these two processes (SC 400, and AG 402) to build the decoy sandbox.

At step 404, process SC begins by creating sandbox control groups and then, at step 406, calling an unshare system call, which allows the process to create and enter its own separate namespaces from the global system (root) namespaces. Note that the PID namespace is a special case, in that the process itself will not enter the newly-created PID namespace; however, its children can enter this namespace. Thus, the SC calls a fork system call to spawn a child inside the PID namespace. This is the positive outcome of the test at step 408. The child will complete the creation of the sandbox, but first it must wait for the Access Granter 402 to map user/group ids from the host to user/group ids in the namespace. This wait for child operation is depicted at step 410.

As depicted, at step 412, the Sandbox Creator 400 drops process capabilities that might otherwise be exploited by an attacker. At step 414, the SC enters a notify and wait operation with respect to (AG, pid). Shifting to the AG side, that process is shown initially in a wait state 47, waiting on an SC. At step 418, user mappings are written. In particular, the Access Granter maps a subset of the host user/group ID to user/group ids in the namespaces by defining mappings in process uid/gid map files. Because the sandbox being created is unprivileged, the root user on the host system is not mapped nor accessible within the sandbox; however, an unprivileged user from the host system is mapped as the root user within the sandbox. Thus, the root user within the sandbox has no more privileges on the system than the user to which it is mapped, but has the appearance of elevated privileges inside the sandbox. After writing the user mappings, AG enters a notify and wait state 420, waiting on the SC.

Once AG 402 has completed mapping users, SC 400 mounts a decoy file system within a mount namespace. This operation is depicted at step 422. As noted above, the decoy file system is a mountable directory containing all the files and directories commensurate with a real OS file system; however, important configuration files and data files can be added or changed to protect critical information. Indeed, although the root user inside the sandbox has privileges over the files, that user is unprivileged on the larger host computer. When SC 400 creates a new mount namespace using unshare, the mount point list of the new namespace is a copy of the caller's list, and it can be modified without affecting other mount namespaces. FIG. 14 provides a high-level overview of how the mount points are changed. In particular, and as depicted there, SC mounts the decoy file system directory and, it makes it the root file system of the sandbox by calling the pivot root system call. In turn, the root file system directory ("I") is swapped out, unmounted, and deleted from within the sandbox, thereby creating a separation between the host file system and the sandbox file system.

Returning to FIG. 4, after mounting the decoy file system, and at step 424, the SC 400 changes the hostname of the sandbox. SC then enters the notify and wait state at step 446, once again waiting on the AG.

Preferably, the process of configuring the network then begins. The new network namespace in the sandbox is a logical copy of the host network stack and has its own routes, firewall rules, and network devices. Shifting back over to the AG side, at step 428 AG creates a virtual interface (veth0) on the host and, at step 430, creates a peer link with a virtual interface (veth1) that is then pushed inside the sandbox's network namespace. The connection between the host's physical interface (eth0) and virtual interface (veth0) is NATed and forwarding rules are setup between the two interfaces. Firewall rules are also added to limit the sandbox's ability to contact neighboring IP addresses so that an attacker cannot probe the network. These operations are depicted at step 432. AG then re-enters the notify and wait state at step 434, waiting on the SC. After the AG is finished, the SC configures a gateway route from veth1 to veth0 at step 436, adds a virtual route at step 438, and then at step 440 notifies the AG the network configuration is complete.

The final action by the Access Granter is to persist the sandbox so that other processes can enter it. On Linux, each namespace is represented as a file within the /proc/[pid]/ns directory of the SC's child PID. Thus, in this embodiment, the namespaces are persisted by bind mounting the files to files in another directory. This operation is depicted at step 442.

At step 444, and to complete the decoy sandbox setup, the Sandbox Creator 400 launches the/sbin/init process, which is given process ID 1 in the sandbox. Thereafter, other processes can be launched, e.g., to make the sandbox look more realistic (to an attacker), and those other processes have the init process as their parent.

FIG. 5 depicts the process flow of FIG. 4 in additional line item detail, with reference to particular Linux OS kernel conventions and nomenclature. The particular sequence of the operations shown in FIG. 4 and FIG. 5 may be altered or varied. In addition, particular operations may be combined with one another.

Although attackers enter the decoy sandbox as unprivileged users, they still can utilize the host's computing resources and certain capabilities that must be dropped for security. Preferably, the decoy sandbox's resource utilization (e.g., memory, CPU, network, I/O usage) is limited by creating a custom set of control groups for the sandbox. To this end, preferably control group (cgroup) settings are configured using a virtual file system. Each file limits some resource utilization, and a process is added to the control group when its process ID is written to a task file. The sandbox's init process ID is added to the control groups on sandbox creation. Any new process created inside the sandbox is automatically restricted by the control groups; however, existing processes entering the namespace must be explicitly added to the control group, e.g., through the task file. In a representative (but non-limiting) implementation, the control group setting limit CPU usage to 20%, memory to 1 GB, disk I/O rates to 5 MB/s, network traffic to 20 kb/s, and the like. Further, to limit the attacker's capabilities in the decoy sandbox, the Linux capabilities API is used to drop capabilities that an attacker could exploit. This was step 412 in FIG. 4. Dropped capabilities include, without limitation, the ability to audit the kernel, to create a kernel module, to set the time, to perform system administration operations, and to boot the system. Note that capabilities for new processes created, and for entering the sandbox, preferably behave the same way as control groups; furthermore, once capabilities are removed from a process, preferably they are not added back.

Thus, when an attacker trips a booby trap using the patching framework described, preferably the attacked process creates a copy of itself (by making a fork system call to enter the sandbox), while the original process recycles itself for further operation. The copy preferably enters the sandbox by making a setns system call on each namespace file in the /tmp/ns directory. As noted above, only a process's child can enter the PID namespace; thus, the copy of the attacked process preferably forks again, leaving the process and the attacker inside the sandbox. Once an exploited process has entered the decoy sandbox, activities—such as new processes created, file accesses, any network traffic generated, etc.—are monitored. Any data collected during the attack can then be used to find similar attacks in the environment (e.g., DMZ, corporate network, cloud), to facilitate mitigation, and other cybersecurity-specific response actions.

To monitor the sandbox, preferably a nesting feature in PID namespaces is used. In particular, each PID namespace has a parent, and that parent is the namespace of the process that created it. A process is visible to other processes in its namespace, and each direct ancestor PID namespace; however, the processes in a child PID namespace cannot see processes in any ancestor PID namespaces. Thus, and using this nesting framework, the system monitors the process moved over to the decoy sandbox from outside the sandbox, all without the attacker knowing.

Another advantage of the sandbox is that any process created or entering the sandbox is re-parented to the/sbin/init process. This fact is used to advantage by monitoring the init process and any of its children, e.g., to gain insight into the attacker's actions. This monitoring may involve, for example, process file accesses, system calls, network activity, etc., preferably leveraging a system-wide monitor that uses filters to store data traces on specific processes and their children. In this embodiment, traces are then exported off host, e.g., for further analysis by security analysts and perimeter defenses.

Thus, and as has been described, unprivileged, lightweight application sandboxing is enabled to facilitate monitoring and analysis of attacks as they occur, all without the overhead of current state-of-the-art approaches. As has been described, the decoy sandbox preferably is an embedded application sandbox that is entered from within the running process (in which the application deception was tripped). Thus, this sandboxing approach also supports programmatic APIs and thus can be used to facilitate development of deception-centric applications. As has been described, the approach transparently moves the suspicious process to an embedded decoy sandbox, with no disruption of the application workflow (i.e., no process restart or reload). Further, the action of switching execution from the original operating environment to the sandbox is triggered from within the running process, thus enabling programmatic approaches for application-level cyber deception.

While the above-described embodiment envisions deploying the sandbox in response to tripping of an application deception in a target process, this is not a limitation. Other triggers of the application-level sandboxing of this disclosure may also be utilized. Thus, for example, the sandbox may be deployed in numerous other scenarios including, without limitation, upon an indication of a suspicious application behavior, to analyze an unknown process upon startup, to analyze a suspicious user's SSH session, and so forth.

Benefits and Advantages

The technique herein provides significant advantages. Using the above-described technique, any production and decoy application can quickly and easily transfer processes, suspected of being attacked, into a lightweight sandbox on-demand. In this way, attackers are separated from benign users and can be monitored with any potential malicious payloads extracted for further analysis. These sandboxes provide added protection and constrain attacker's capabilities, all with no performance overhead.

The approach herein provides for "lightweight" application sandboxing, based on Linux namespaces, and that enables monitoring and analysis of attacks as they occur without the overhead of current state-of-the-art approaches.

The sandboxing approach herein facilitates application-level software deception techniques including, as described above, rapid deployments of application-level deceptions (i.e., booby traps) to implant cyber deceptions into running legacy applications—both on production and decoy systems. More generally, the techniques described herein integrate deceptive capabilities into information systems with genuine production value (e.g., servers and software that offer genuine services to legitimate users).

The techniques herein advantageously enabling embedding cyber traps into commercial off-the-shelf (COTS) applications and thereby provides new vantage points for security analysts to identify threats and gain attack insights. Deceptions are purveyed via genuine applications and services, and not merely some ad hoc decoy. The approach provides a significantly lower barrier to deployment of high-interaction deceptions with little or no zero false positives. The approach has wide applicability, e.g., for early attack alerting and logging, attacker sandboxing for attribution and forensics, automated synthesis of high-interaction honeypots.

In summary, a lightweight and low overhead application sandboxing approach is provided that enables monitoring and analysis of attacks as they occur, and that preferably takes advantage of application-deception techniques that utilize on-demand, dynamic legacy application booby trapping.

Enabling Technologies

Figure 7:
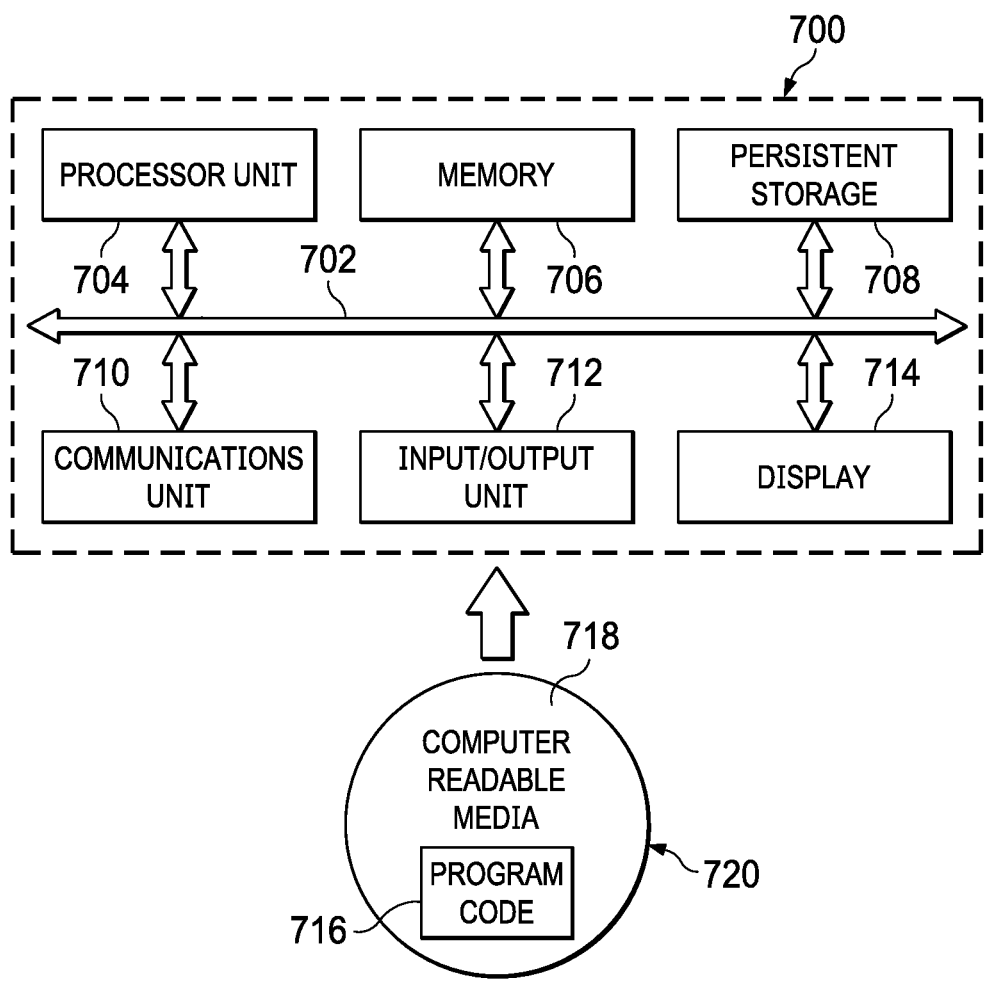
FIG. 7 is a block diagram of a data processing system in which exemplary aspects of the illustrative embodiments may be implemented.

FIG. 7 is a block diagram of a data processing system in which exemplary aspects of the illustrative embodiments may be implemented. Data processing system 700 is an example of a computer in which computer usable code or instructions implementing the processes for illustrative embodiments of the disclosure may be located. In this illustrative example, data processing system 700 includes communications fabric 702, which provides communications between processor unit 704, memory 706, persistent storage 708, communications unit 710, input/output (I/O) unit 712, and display 714.

Processor unit 704 serves to execute instructions for software that may be loaded into memory 706. Processor unit 704 may be a set of one or more processors or may be a multi-processor core, depending on the particular implementation. Further, processor unit 704 may be implemented using one or more heterogeneous processor systems in which a main processor is present with secondary processors on a single chip. As another illustrative example, processor unit 704 may be a symmetric multi-processor (SMP) system containing multiple processors of the same type.

Memory 706 and persistent storage 708 are examples of storage devices. A storage device is any piece of hardware that is capable of storing information either on a temporary basis and/or a permanent basis. Memory 706, in these examples, may be, for example, a random access memory or any other suitable volatile or non-volatile storage device. Persistent storage 708 may take various forms depending on the particular implementation. For example, persistent storage 708 may contain one or more components or devices. For example, persistent storage 708 may be a hard drive, a flash memory, a rewritable optical disk, a rewritable magnetic tape, or some combination of the above. The media used by persistent storage 708 also may be removable. For example, a removable hard drive may be used for persistent storage 708.

Communications unit 710, in these examples, provides for communications with other data processing systems or devices. In these examples, communications unit 710 is a network interface card. Communications unit 710 may provide communications through the use of either or both physical and wireless communications links.

Input/output unit 712 allows for input and output of data with other devices that may be connected to data processing system 700. For example, input/output unit 712 may provide a connection for user input through a keyboard and mouse. Further, input/output unit 712 may send output to a printer. Display 714 provides a mechanism to display information to a user.

Instructions for the operating system and applications or programs are located on persistent storage 708. These instructions may be loaded into memory 706 for execution by processor unit 704. The processes of the different embodiments may be performed by processor unit 704 using computer implemented instructions, which may be located in a memory, such as memory 706. These instructions are referred to as program code, computer-usable program code, or computer-readable program code that may be read and executed by a processor in processor unit 704. The program code in the different embodiments may be embodied on different physical or tangible computer-readable media, such as memory 706 or persistent storage 708.

Program code 77 is located in a functional form on computer-readable media 718 that is selectively removable and may be loaded onto or transferred to data processing system 700 for execution by processor unit 704. Program code 77 and computer-readable media 718 form computer program product 720 in these examples. In one example, computer-readable media 718 may be in a tangible form, such as, for example, an optical or magnetic disc that is inserted or placed into a drive or other device that is part of persistent storage 708 for transfer onto a storage device, such as a hard drive that is part of persistent storage 708. In a tangible form, computer-readable media 718 also may take the form of a persistent storage, such as a hard drive, a thumb drive, or a flash memory that is connected to data processing system 700. The tangible form of computer-readable media 718 is also referred to as computer-recordable storage media. In some instances, computer-recordable media 718 may not be removable.

Alternatively, program code 77 may be transferred to data processing system 700 from computer-readable media 718 through a communications link to communications unit 710 and/or through a connection to input/output unit 712. The communications link and/or the connection may be physical or wireless in the illustrative examples. The computer-readable media also may take the form of non-tangible media, such as communications links or wireless transmissions containing the program code. The different components illustrated for data processing system 700 are not meant to provide architectural limitations to the manner in which different embodiments may be implemented. The different illustrative embodiments may be implemented in a data processing system including components in addition to or in place of those illustrated for data processing system 700. Other components shown in FIG. 7 can be varied from the illustrative examples shown. As one example, a storage device in data processing system 700 is any hardware apparatus that may store data. Memory 706, persistent storage 708, and computer-readable media 718 are examples of storage devices in a tangible form.

In another example, a bus system may be used to implement communications fabric 702 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 706 or a cache such as found in an interface and memory controller hub that may be present in communications fabric 702.

Computer program code for carrying out operations of the present invention may be written in any combination of one or more programming languages, including an object-oriented programming language such as Java™, Smalltalk, C++ or the like, functional programming languages such as SML, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIG. 7 may vary depending on the implementation. Other internal hardware or peripheral devices, such as flash memory, equivalent non-volatile memory, or optical disk drives and the like, may be used in addition to or in place of the hardware depicted in FIG. 7. Also, the processes of the illustrative embodiments may be applied to a multi-processor data processing system, other than the SMP system mentioned previously, without departing from the spirit and scope of the disclosed subject matter.

The techniques herein may be used with a host machine (or set of machines, e.g., running a cluster) operating in a standalone manner, or in a networking environment such as a cloud computing environment. Cloud computing is an information technology (IT) delivery model by which shared resources, software and information are provided over the Internet to computers and other devices on-demand. With this approach, an application instance is hosted and made available from Internet-based resources that are accessible through a conventional Web browser or mobile application over HTTP. Cloud compute resources are typically housed in large server farms that run one or more network applications, typically using a virtualized architecture wherein applications run inside virtual servers, or so-called "virtual machines" (VMs), that are mapped onto physical servers in a data center facility. The virtual machines typically run on top of a hypervisor, which is a control program that allocates physical resources to the virtual machines.

Typical cloud computing service models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Typical deployment models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

Some clouds are based upon non-traditional IP networks. Thus, for example, a cloud may be based upon two-tier CLOS-based networks with special single layer IP routing using hashes of MAC addresses. The techniques described herein may be used in such non-traditional clouds.

Figure 8:
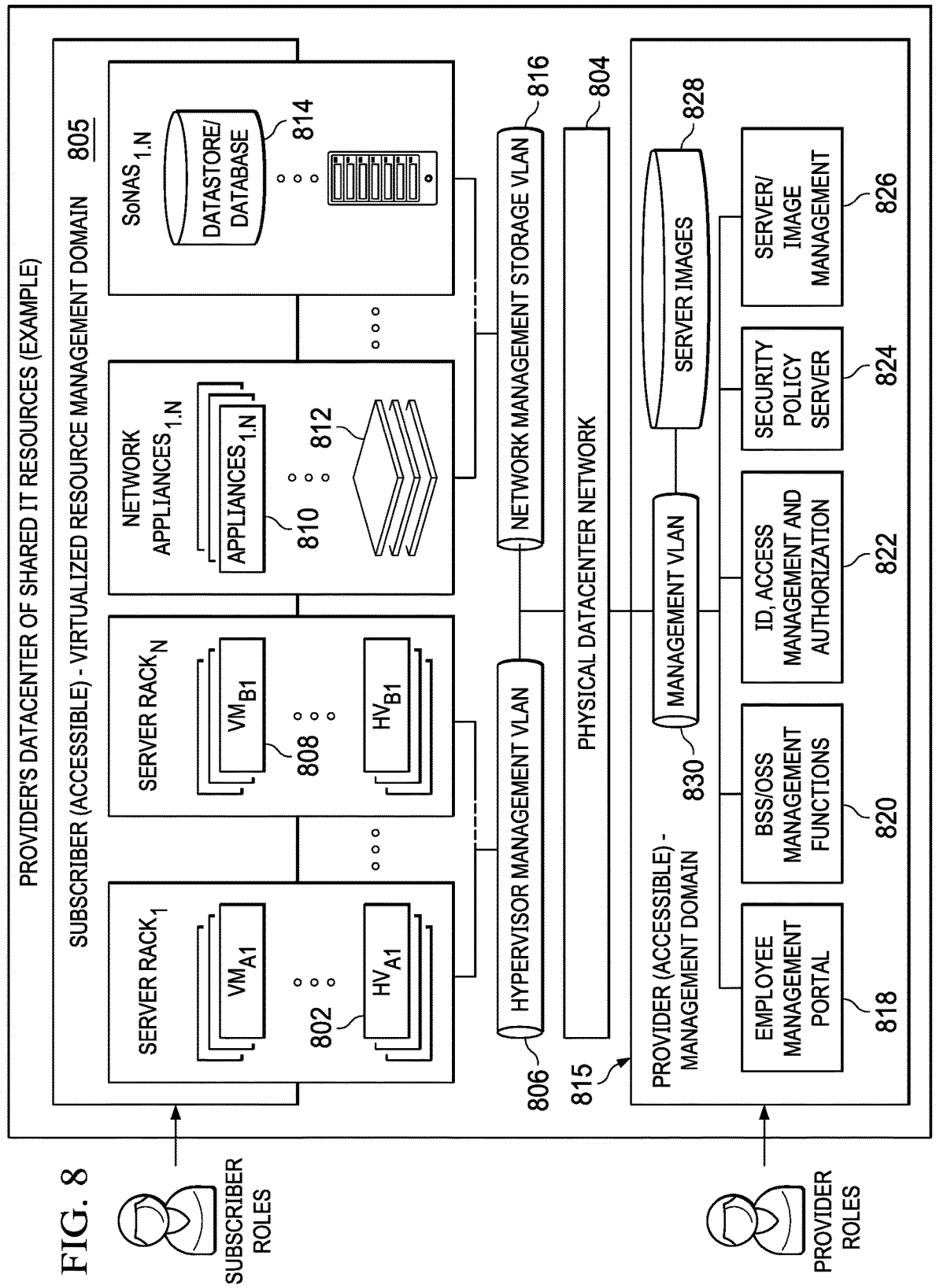
FIG. 8 depicts a representative cloud computing environment in which exemplary aspect of this disclosure may be implemented.

FIG. 8 illustrates a typical Information Technology (IT) infrastructure that supports virtualization of resources and in which the described techniques of this disclosure may be implemented. In this example, the IT datacenter that provides shared (public) resources is the "provider" and a customer or company that uses these shared resources to host, store and manage its data and applications (in all forms) is the "subscriber" (or "customer" or "tenant"). In FIG. 8, an example virtual machine hosting environment (alternately referred to herein as a data center or "cloud") is illustrated. This environment comprises host machines (HVs) 802 (e.g., servers or like physical machine computing devices) connected to a physical datacenter network 804, typically via a hypervisor management VLAN 806. Although not depicted explicitly, typically the environment also includes load balancers, network data switches (e.g., top-of-rack switches), firewalls, and the like. As shown in FIG. 8, physical servers 802 are each adapted to dynamically provide one or more virtual machines (VMs) 808 using virtualization technology. Such technology is available commercially, e.g., from VMware® or others. Server virtualization is a technique that is well-known in the art. As depicted, multiple VMs can be placed into a single host machine and share the host machine's CPU, memory and other resources, thereby increasing the utilization of an organization's data center. In this environment, tenant applications 810 are hosted in network appliances 812, and tenant data is stored in data stores and databases 814. The applications and data stores are connected to the physical datacenter network 804, typically via a network management/storage VLAN 807. Collectively, the virtual machines, applications and tenant data represent a subscriber-accessible virtualized resource management domain 805. Through this domain, the subscriber's employees may access and manage (using various role-based privileges) virtualized resources they have been allocated by the provider and that are backed by physical IT infrastructure. The bottom portion of the infrastructure illustrates a provider-accessible management domain 815. This domain comprises a provider employee management portal 818, business support services (BSS) and operational support services (OSS) management functions 820, various identity and access management functions 822, a security policy server 824, and management functions 826 to manage the server images 828. These functions interface to the physical datacenter network via a management VLAN 830.

Generalizing, the cloud computing infrastructure provides for a virtual machine hosting environment that comprises host machines (e.g., servers or like physical machine computing devices) connected via a network and one or more management servers. Typically, the physical servers are each adapted to dynamically provide one or more virtual machines using virtualization technology, such as VMware ESX/ESXi. Multiple VMs can be placed into a single host machine and share the host machine's CPU, memory and other resources, thereby increasing the utilization of an organization's data center. In a non-limiting implementation, representative platform technologies are, without limitation, IBM System x® servers with VMware vSphere 4.1 Update 1 and 5.0.

In a representative container cloud compute environment, a host executes an operating system (OS), such as the Linux kernel. Containers refers to an operating-system-level virtualization method for running multiple isolated computing workloads (containers) on a control host using a single operating system kernel. The approach effectively partitions the resources managed by the single operating system into isolated groups to better balance the conflicting demands on resource usage between the isolated groups. In contrast to virtualization, neither instruction-level emulation nor just-in-time compilation is required. In addition, containers can run instructions native to the core CPU without any special interpretation mechanisms. By providing a way to create and enter containers, an operating system gives applications the illusion of running on a separate machine while at the same time sharing many of the underlying resources.

As noted above, the Linux kernel also has a feature referred to as Namespaces. As described, the technique of this disclosure preferably is implemented within the operating system kernel itself using this facility. While this is a preferred implementation strategy, it is not necessarily limiting, as the described technique(s) might also be implemented as one or more applications (whether in user space or otherwise). Generalizing, one of ordinary skill in the art will recognize that the above-described JIT application deception deployment and sandboxing techniques may be implemented (as a product or service) either in a standalone manner, or within or in association with a cloud platform system or appliance, or using any other type of cloud management systems, products, devices, programs or processes.

As previously noted, the above-described components typically are each implemented as software, i.e., as a set of computer program instructions executed in one or more hardware processors. As has been described, the components are shown as distinct, but as noted this is not a requirement, as the components may also be integrated with one another in whole or in part. One or more of the components may execute in a dedicated location, or remote from one another. One or more of the components may have sub-components that execute together to provide the functionality. There is no requirement that particular functions be executed by a particular component as named above, as the functionality herein (or any aspect thereof) may be implemented in other or systems.

The approach may be implemented by any service provider that operates infrastructure. It may be available as a managed service, e.g., provided by a cloud service. The components may implement the workflow synchronously or asynchronously, continuously and/or periodically.

The approach may be integrated with other enterprise- or network-based security methods and systems, such as in a STEM, or the like.

The functionality described in this disclosure may be implemented in whole or in part as a standalone approach, e.g., a software-based function executed by a hardware processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

Aspects of this disclosure may be implemented in or in conjunction with various server-side architectures including simple n-tier architectures, web portals, federated systems, and the like. The techniques herein may be practiced in a loosely-coupled server (including a "cloud"-based) environment.

Still more generally, the subject matter described herein can take the form of an entirely hardware embodiment, an entirely software embodiment or an embodiment containing both hardware and software elements. In a preferred embodiment, the function is implemented in software, which includes but is not limited to firmware, resident software, microcode, and the like. Furthermore, as noted above, the identity context-based access control functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the knowledge graph generation and processing techniques are implemented in a special purpose computer, preferably in software executed by one or more processors. The software is maintained in one or more data stores or memories associated with the one or more processors, and the software may be implemented as one or more computer programs. Collectively, this special-purpose hardware and software comprises the functionality described above.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

The target live application is any executing process, program, network service, module, or other computational component or system.

The techniques herein may be practiced as well with non-live applications, e.g., to facilitate development, debugging, testing or other operational or forensic analysis.

The techniques herein improve computing functioning by providing JIT provisioning, detection, monitoring and analysis of attacks as they occur in computing systems more efficiently and without the significant overhead required of current state-of-the art approaches. Computing systems that incorporate the techniques herein provide these advantages transparently and without disruption of application workflow, thereby increasing the reliability and availability of the underlying computer system. Computer systems implemented with the approach herein operate more efficiently and with less cyber security-specific processing and storage requirements than they would otherwise.

The nomenclature used herein also should not be taken to be limiting.

Having described the invention, what we claim is as follows.

The invention claimed is:

1. A method for application-level sandboxing in association with a host operating system that includes a namespace facility for creating and managing a set of namespaces, comprising:
executing a first process as an unprivileged user, the first process distinct from the host operating system and using the namespace facility to create an unprivileged decoy sandbox;
associating within the unprivileged decoy sandbox one of: a decoy filesystem, and a logical copy of a host network stack;
executing a second process as a privileged user, the second process distinct from the host operating system and granting the unprivileged decoy sandbox access to one or more computing resources of the host; and
responsive to tripping by an attacker of an application deception in a target process, receiving a copy of the target process in the unprivileged decoy sandbox; and
monitoring actions of the attacker within the unprivileged decoy sandbox.

2. The method as described in claim 1 wherein the target process creates the copy by making a fork system call while continuing to execute.

3. The method as described in claim 1 further including spawning a child of the copy inside a process identifier (PID) namespace of the set of namespaces, and wherein the copy is restricted from entering the PID namespace.

4. The method as described in claim 3 wherein the child enters the unprivileged decoy sandbox by making a system call on one or more other namespaces of the set of namespaces.

5. The method as described in claim 4 wherein the decoy filesystem is mounted within a mount namespace in the unprivileged decoy sandbox, the decoy filesystem comprising system files associated with an actual filesystem associated with the host.

6. The method as described in claim 4 wherein the logical copy of the host network stack and an associated network are configured within a network namespace in the unprivileged decoy sandbox.

7. The method as described in claim 3 wherein the actions of the attacker are monitored by monitoring the child inside the PID namespace from an ancestor PID namespace.

8. The method as described in claim 1 further including enforcing a restriction on utilization of a host computing resource for the unprivileged decoy sandbox.

9. An apparatus for application-level sandboxing in association with a host operating system that includes a namespace facility for creating and managing a set of namespaces, comprising:
a processor;
computer memory holding computer program instructions executed by the processor, the computer program instructions configured to:
execute a first process as an unprivileged user, the first process distinct from the host operating system and using the namespace facility to create an unprivileged decoy sandbox;
associate within the unprivileged decoy sandbox one of: a decoy filesystem, and a logical copy of a host network stack;
execute a second process as a privileged user, the second process distinct from the host operating system and granting the unprivileged decoy sandbox access to one or more computing resources of the host; and
responsive to tripping by an attacker of an application deception in a target process, receive a copy of the target process in the unprivileged decoy sandbox; and
monitor actions of the attacker within the unprivileged decoy sandbox.

10. The apparatus as described in claim 9 wherein the target process creates the copy by making a fork system call while continuing to execute.

11. The apparatus as described in claim 9 wherein the computer program instructions are further configured to spawn a child of the copy inside a process identifier (PID) namespace of the set of namespaces, and to restrict the copy from entering the PID namespace.

12. The apparatus as described in claim 11 wherein the child enters the unprivileged decoy sandbox by making a system call on one or more other namespaces of the set of namespaces.

13. The apparatus as described in claim 12 wherein the computer program instructions are further configured to mount the decoy filesystem within a mount namespace in the unprivileged decoy sandbox, the decoy filesystem comprising system files associated with an actual filesystem associated with the host.

14. The apparatus as described in claim 12 wherein the computer program instructions are further configured to create the logical copy of the host network stack and an associated network within a network namespace in the unprivileged decoy sandbox.

15. The apparatus as described in claim 11 wherein the actions of the attacker are monitored by computer program instructions further configured to monitor the child inside the PID namespace from an ancestor PID namespace.

16. The apparatus as described in claim 9 wherein the computer program instructions are further configured to enforce a restriction on utilization of a host computing resource for the unprivileged decoy sandbox.

17. A computer program product in a non-transitory computer readable medium, the computer program product holding computer program instructions executed by a host machine for application-level sandboxing in association with a host operating system that includes a namespace facility for creating and managing a set of namespaces, the computer program instructions comprising program code operative to:
executing a first process as an unprivileged user, the first process distinct from the host operating system and using the namespace facility to create an unprivileged decoy sandbox;
associating within the unprivileged decoy sandbox one of: a decoy filesystem, and a logical copy of a host network stack;
executing a second process as a privileged user, the second process distinct from the host operating system and granting the unprivileged decoy sandbox access to one or more computing resources of the host; and
responsive to tripping by an attacker of an application deception in a target process, receiving a copy of the target process in the unprivileged decoy sandbox; and
monitoring actions of the attacker within the unprivileged decoy sandbox.

18. The computer program product as described in claim 17 wherein the target process creates the copy by making a fork system call while continuing to execute.

19. The computer program product as described in claim 17 wherein the computer program instructions are further configured to spawn a child of the copy inside a process identifier (PID) namespace of the set of namespaces, and to restrict the copy from entering the PID namespace.

20. The computer program product as described in claim 19 wherein the child enters the unprivileged decoy sandbox by making a system call on one or more other namespaces of the set of namespaces.

21. The computer program product as described in claim 20 wherein the computer program instructions are further configured to mount [a] the decoy filesystem within a mount namespace in the unprivileged decoy sandbox, the decoy filesystem comprising system files associated with an actual filesystem associated with the host.

22. The computer program product as described in claim 20 wherein the computer program instructions are further configured to create the logical copy of the host network stack and an associated network within a network namespace in the unprivileged decoy sandbox.

23. The computer program product as described in claim 19 wherein the actions of the attacker are monitored by computer program instructions further configured to monitor the child inside the PID namespace from an ancestor PID namespace.

24. The computer program product as described in claim 17 wherein the computer program instructions are further configured to enforce a restriction on utilization of a host computing resource for the unprivileged decoy sandbox.

25. A method for application-level sandboxing in association with a host operating system that includes a namespace facility for creating and managing a set of namespaces, comprising:
executing a first process as an unprivileged user, the first process distinct from the host operating system and using the namespace facility to create an unprivileged decoy sandbox;
associating within the unprivileged decoy sandbox one of: a decoy filesystem, and a logical copy of a host network stack;
executing a second process as a privileged user, the second process distinct from the host operating system and granting the unprivileged decoy sandbox access to one or more computing resources of the host; and responsive to occurrence of suspicious behavior in association with the computing system, receiving a process associated with the suspicious behavior in the unprivileged decoy sandbox; and monitoring the process within the unprivileged decoy sandbox.

\* \* \* \* \*